United States Patent

[11] 3,623,119

[72] Inventor Robert F. Orr
Toledo, Ohio
[21] Appl. No. 807,054
[22] Filed Mar. 13, 1969
[45] Patented Nov. 23, 1971
[73] Assignee Reliance Electric Company
Toledo, Ohio

[54] CARD PUNCH SYSTEM
3 Claims, 1 Drawing Fig.

[52] U.S. Cl. 346/9, 234/58, 346/50
[51] Int. Cl. G01d 9/38
[50] Field of Search 348/9–11, 50; 234/16, 58; 171/3

[56] References Cited
UNITED STATES PATENTS

| | | | |
|---|---|---|---|
| 2,858,888 | 11/1958 | McGayhey et al. | 234/58 |
| 2,961,647 | 11/1960 | Dzaack | 346/9 |
| 3,500,431 | 3/1970 | Baskin | 346/74 |

*Primary Examiner*—Richard B. Wilkinson
*Assistant Examiner*—Edith C. Simmons
*Attorney*—Thomas H. Grafton

ABSTRACT: A card punch system including a card punch machine comprising program drum contacts operated in accordance with a program code, a data source electrically connected to the card punch, and circuit means driven by the program drum contacts electrically connected to the data source for entering data automatically into the card punch in serial fashion in accordance with said program code.

| RELAY | 1 | 2 | 4 | 8 |
|---|---|---|---|---|
| A | | | | X |
| B | | | X | X |
| C | | | X | |
| D | | X | X | |
| E | | X | X | X |
| F | | X | | X |
| G | | X | | |
| H | X | X | | |
| I | X | X | | X |
| J | X | X | X | X |
| K | X | X | X | |
| L | X | | X | |
| M | X | | X | X |
| N | X | | | X |

INVENTOR.
ROBERT F. ORR
BY
Thomas H. Grafton
ATTORNEY

CARD PUNCH SYSTEM

BACKGROUND OF THE INVENTION

The invention relates to systems such as weighing scale systems wherein weight and selective numbering data are entered into card punch machines one digit at a time so that the cards can be shifted to locate each digit in its proper column.

SUMMARY OF THE INVENTION

Specifically, the invention envisions the use of a conventional card punch machine having an existing program drum and keyboard. Ordinarily, the program drum automatically controls skipping and duplicating operations so that the digits and/or letters set up on the keyboard are punched in cards in the proper columns. In the invention, the program drum drives a novel interface circuit controlling the entering of data from a remote data source, rather than from the card punch's keyboard, in serial fashion in accordance with the drum's program code.

The objects of this invention are to so combine a conventional card punch machine and a conventional remote data source that data from the source is entered into the keypunch automatically in serial fashion, and to improve techniques for entering data into card punch machines.

DESCRIPTION OF THE PREFERRED EMBODIMENT

Figures 1, 2:
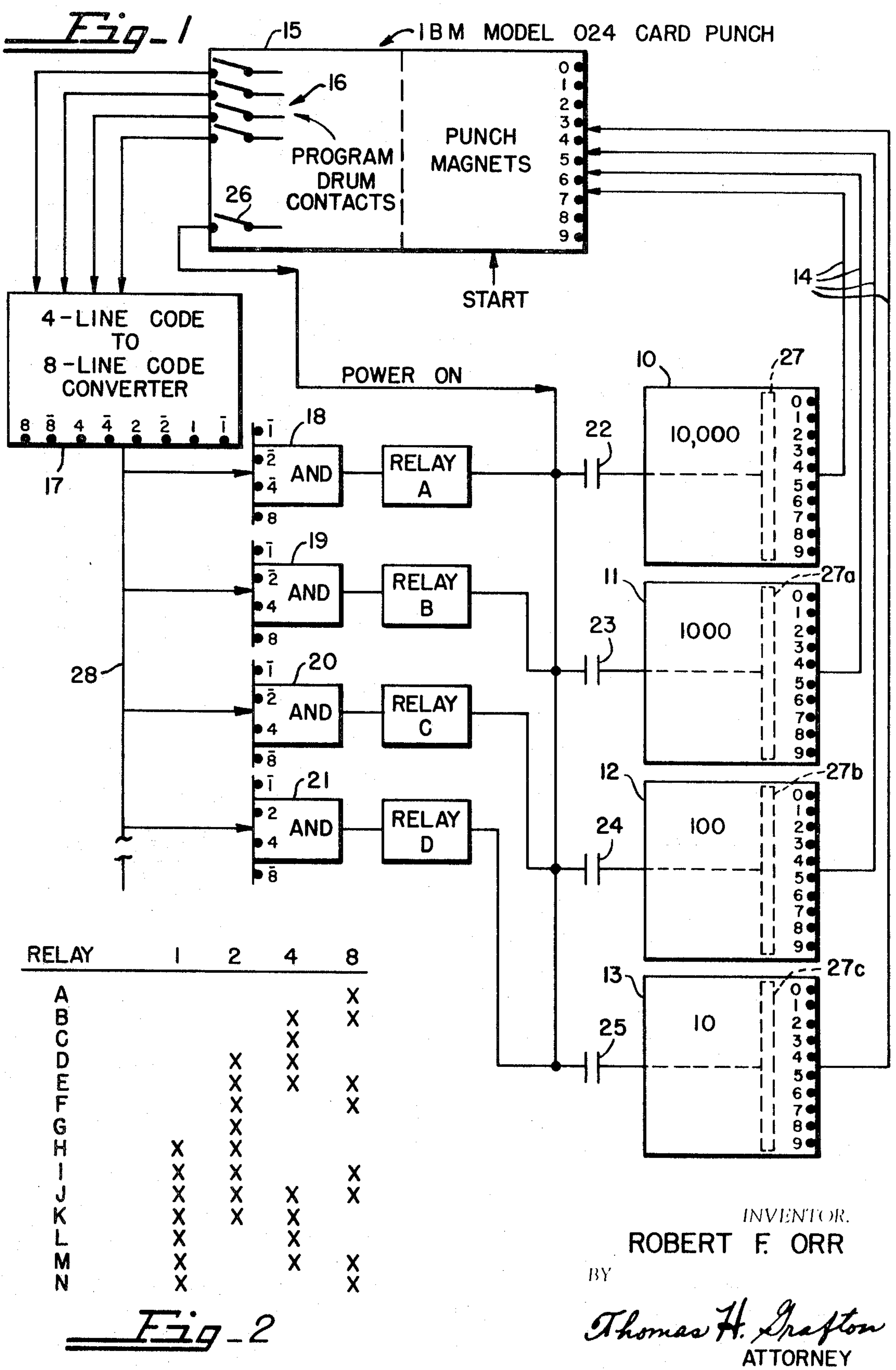
FIG. 1 is a block diagram of a card punch system.
FIG. 2 is a table showing a program code used in controlling the system shown in FIG. 1.

U.S. Pat. No. 3,168,980 issued Feb. 9, 1965 in the names of Roger A. Willyard and Clarence E. Adler discloses a readout or mechanical sensing mechanism for sensing step cams which are positioned in accordance with the weight of a load upon a weighing scale. The sensing mechanism sets up either mechanical recorders, such as printers, or electrical recorders, such as electric typewriters. In setting up an electrical recorder, movable brushes cooperate with commutator contacts. For example, if a "9" is read out in a certain number place, the respective brush is positioned to connect an energized common conductor to the respective 9-wire. Such contacts are shown in FIG. 1 as "0–9" terminals of a readout or remote data source having a 10,000-number place section 10, a 1,000-place section 11, a 100-place section 12, and a 10-place section 13. If a load of 9,999 pounds is read out for example, the "9" terminal in each of the sections 10–13 is energized by being brush-connected to common conductors 27, 27*a*, 27*b* and 27*c* , respectively.

Cables 14 contain leads connecting the four "0" readout terminals to the "0" punch magnet terminal in an International Business Machine card punch Model 024, identified as reference numeral 15 in FIG. 1. Similarly, the four "1" readout terminals are connected to the "1" punch magnet terminal, etc. The digits of the respective number places must be entered in the card punch 15 in serial fashion one digit at a time so that the cards can be shifted to locate each digit in its proper column.

The IBM 024 card punch 15 is illustrated and described in Form 22–5759–5, copyrighted 1949, 1950, 1951 and 1952 by International Business Machines Corporation. The card punch 15 has an existing program drum and keyboard. The program drum consists in a punched card which before it was punched is a duplicate of the cards to be punched. The card punch machine 15 is controlled automatically by the program drum (punched card) so that skipping and duplicating operations are accomplished automatically. Digits and/or letters set up on the keyboard are punched in the cards in the proper columns.

The program drum punched card moves around its axis in phase with the card being punched moving through the machine. In the practice of the invention, four of the existing program drum contacts 16 are used to drive an interface circuit controlling the entering of data from the data source sections 10–13 into the key punch 15. The program drum contacts 16 are operated in accordance with the program code punched into the program drum card and are in circuit with a four-line code to eight-line code converter 17. The converter 17 includes a buffer to produce four 1–2–4–8 binary coded decimal signals and an inverter to produce four additional signals of opposite polarity $\overline{1}-\overline{2}-\overline{4}-\overline{8}$. The $\overline{1}-\overline{2}-\overline{4}-8$ terminals of the converter 17 are connected to the $\overline{1}-\overline{2}-\overline{4}-8$ terminals of an AND-gate 18 by leads within a cable 28. Similarly, the $\overline{1}-\overline{2}$-a'-8 terminals of the converter 17 are connected to the $\overline{1}-\overline{2}$-a'-8 terminals of the AND-gate 19, the $\overline{1}-\overline{2}-4-\overline{8}$ terminals of the converter 17 are connected to the $\overline{1}-\overline{2}-4-\overline{8}$ terminals of an AND-gate 20, and the $\overline{1}-2-4-\overline{8}$ terminals of the converter 17 are connected to the $\overline{1}-2-4-\overline{8}$ terminals of an AND-gate 21. There are an additional 10 AND gates not shown connected to the converter 17, the eight-line code of the converter 17 being such and the connections from the converter 17 to all of the 14 AND gates being such that only one AND gate is satisfied at any one time. The code is shown in FIG. 2.

AND-gates 18–21 control relays A–D, respectively. The relays A–D operate contacts 22–25, respectively. Similarly, the above additional AND gates (not shown) control relays E–N, respectively, which are listed in FIG. 2. When one of the 14 AND gates is satisfied it drives its respective relay. As an example, to operate relay A, the code requires one hole in the program drum card so located that one of the program drum contacts 16 closes to produce $\overline{1}-\overline{2}-\overline{4}-8$ signals. This satisfies the condition for all four inputs to the AND-gate 18 which drives and operates relay A (contact 22 closed). As the program drum card rotates, the contacts 16 sense the holes in the card which are punched in accordance with a program code. The code shown in FIG. 2 is such that during one revolution of the program drum it is possible to satisfy all of the AND gates, but only one at a time. Of course, in a particular program it is not necessary to use all of the relays A–N, the program drum card being punched to skip or use the desired ones of the relays A–N. No relays are needed if the voltages at the outputs of the AND gates happen to be compatible with the keypunch machine.

The purpose of the interface circuit is to automatically program the card punch to skip to the desired columns in which it is desired to punch data. When the first desired column is reached, the program drum which has been punched with the code shown in FIG. 2 operates relay A, etc. As an example, it is desired to punch a card showing that 9,999 pounds of material has been received from a source identified as number 252. The scale readout sections 10–13 each has its "9" terminal energized due to the load weighing 9,999 pounds upon the scale and "252" is punched into the keyboard (not shown) of the keypunch 15 or of a remotely located key station. The program drum card is punched so that the contacts 16 are operated in accordance with the code shown in FIG. 2.

When the weight readout is complete, the "START" signal (FIG. 1) is given and an existing cam in the card punch 15 closes contacts 26 to apply power to the relay contacts 22–25. The cam-operated contacts 26 are closed during the single revolution of the program drum. When the first desired weight column on the card to be punched is reached, relay A is energized and closes its contact 22 applying power to the common conductor 27 in the readout section 10. This excites the brush-connected "9" readout terminal to excite in turn the "9" punch magnet. A nine is punched in the 10,000-weight place. Thereafter, relays B–D are energized successively following shifts in the card to excite the "9" punch magnet three more times to punch nines in the 1,000-100- and 10-weight places. When the first desired key station column on the card is reached, relay E (FIG. 2) is energized to excite the "2" punch magnet in similar fashion. A two is punched in the first key station column. Thereafter, relays F and G are energized successively following shifts in the card to excite first the "5" punch magnet and then the "2 " punch magnet to punch a five and a two in the respective key station column on the card.

The card punch includes the existing program drum contacts 16 which are operated in accordance with a program code. The code shown in FIG. 2 operates each of the 14 relays A–N one at a time per revolution of the program drum. The card punch also includes the existing punch magnets which are energized when their respective terminals "0–9" are energized. The remotely located data source has four sections 10–13 one for each number place in weight readings. The terminals of the readout sections are connected to the corresponding punch magnet terminals. There is a gate 18–21 one for each data source section 10–13 so controlled by the program drum contacts 16 that only one gate is open at a time during one cycle of the card punch. An open gate enables transfer of data from its respective data source section to the punch magnets. The purposes of the circuitry added to the existing card punch and data source is to enter data into the card punch automatically from the data source in serial fashion in accordance with the program code.

It is to be understood that the above description is illustrative of this invention and that various modifications thereof can be utilized without departing from its spirit and scope.

Having described the invention, I claim:

1. A card punch system comprising, in combination, a card punch machine including program drum contacts operated in accordance with a program code and data-entering means for entering data into the machine, a remote data source having a plurality of sections electrically connected to the data-entering means, and circuit means including a plurality of gates one for each data source section and converter means between the program drum contacts and the gates so controlled by the program drum contacts that the converter means opens only one gate at a time, an open gate enabling transfer of data from its respective data source section to the data-entering means, whereby data is entered into the card punch machine automatically from the data source in serial fashion in accordance with said program code.

2. A card punch system according to claim 1 wherein the data source is a weighting scale weight readout and each data source section corresponds to one number place in the weight.

3. A card punch system comprising, in combination, a card punch including program drum contacts operated in accordance with a program code and producing a number of signals in accordance with the program code, a data source electrically connected to the card punch, and circuit means driven by the program drum contacts electrcially connected to the data source for increasing said number of signals and entering data automatically into the card punch in serial fashion in accordance with said program code.

* * * * *